United States Patent
Won

(10) Patent No.: US 9,854,233 B2
(45) Date of Patent: Dec. 26, 2017

(54) APPARATUS FOR PROCESSING VIDEO, METHOD OF DRIVING APPARATUS FOR PROCESSING VIDEO, AND COMPUTER READABLE RECORDING MEDIUM

(71) Applicant: Samsung Electronics Co., Ltd., Suwon-si (KR)

(72) Inventor: Kang-young Won, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/272,940

(22) Filed: Sep. 22, 2016

(65) Prior Publication Data
US 2017/0104987 A1 Apr. 13, 2017

(30) Foreign Application Priority Data
Oct. 8, 2015 (KR) .................. 10-2015-0141364

(51) Int. Cl.
*H04N 17/00* (2006.01)
*G09G 3/00* (2006.01)
*G09G 3/20* (2006.01)
*H04B 3/46* (2015.01)

(52) U.S. Cl.
CPC .......... *H04N 17/004* (2013.01); *G09G 3/006* (2013.01); *G09G 3/2096* (2013.01); *H04B 3/46* (2013.01); *G09G 2330/12* (2013.01); *G09G 2340/02* (2013.01); *G09G 2370/14* (2013.01)

(58) Field of Classification Search
CPC ............................ H04N 17/004; H04N 17/04
See application file for complete search history.

(56) References Cited

U.S. PATENT DOCUMENTS

| 6,414,960 B1* | 7/2002 | Kuhn | H04N 7/088 348/181 |
| 2008/0208908 A1* | 8/2008 | Kashyap | H04N 21/43615 |
| 2010/0053337 A1* | 3/2010 | Kirk | H04N 17/045 348/181 |
| 2011/0116807 A1 | 5/2011 | Park et al. | |
| 2014/0036094 A1 | 2/2014 | Won | |

FOREIGN PATENT DOCUMENTS

| JP | 2010-245616 | 10/2010 |
| JP | 2011-130231 | 6/2011 |
| KR | 10-2011-0053536 | 5/2011 |
| KR | 10-1504742 | 3/2015 |

* cited by examiner

*Primary Examiner* — Michael Teitelbaum
(74) *Attorney, Agent, or Firm* — Staas & Halsey LLP

(57) ABSTRACT

An apparatus for processing a video, a method of driving the apparatus for processing the video, and a computer readable recording medium are provided. The apparatus includes a storage unit configured to store a plurality of set values corresponding to at least one factor used for a quality measurement of a communication signal line, and a controller configured to transmit a plurality of test signals respectively corresponding to the plurality of set values to a signal receiver connected to the communication signal line and receive a plurality of regression signals respectively corresponding to the plurality of transmitted test signals from the signal receiver. The controller determines a set value of the factor based on the plurality of received regression signals and transmits a signal to the signal receiver based on the determined set value of the factor.

18 Claims, 14 Drawing Sheets

710

900'/1010'

APPARATUS FOR PROCESSING VIDEO, METHOD OF DRIVING APPARATUS FOR PROCESSING VIDEO, AND COMPUTER READABLE RECORDING MEDIUM

CROSS-REFERENCE TO RELATED APPLICATIONS

This application claims priority from Korean Patent Application No. 10-2015-0141364, filed on Oct. 8, 2015, in the Korean Intellectual Property Office, the disclosure of which is incorporated herein by reference in its entirety.

BACKGROUND

1. Field

Apparatuses and methods consistent with the present disclosure relate to an apparatus for processing a video, a method of driving the apparatus for processing the video, and a computer readable medium, and more particularly, to a video processing apparatus for completing a margin design by automatically diagnosing a physical signal quality of a communication signal line and finding an optimum value by the diagnosis in order to secure a communication quality of a high-speed interface applied to a TV, a method of driving the video processing apparatus, and a computer readable recording medium.

2. Description of the Related Art

In general, a television (TV) is an apparatus for receiving an image signal (or a broadcast signal), i.e., a video signal and an audio signal, through an antenna, performing various types of signal processing including detection, synchronization, and demodulation, and enabling a viewer to view the image signal through a monitor or playing a signal input through an external input signal video cassette recorder (VCR), an audio, or the like. Also, the TV has been developed into a digital TV capable of having a multifunction of grafting digital image compression technology, such as currently extremely advanced MPEG or the like, or high capacity information storage technology, such as a hard disk, a compact disk, or the like, by simply restoring and playing an input image signal or straying from a level for playing an external input signal.

A general liquid crystal display (LCD) or a plasma display panel (PDP) TV supplies video data on each pixel to a source driver that supplies a signal to vertical lines of a panel and controls a light-emission time of each pixel by using a scan driver that supplies a signal to horizontal lines of the panel. The panel may receive the above-mentioned video data by using a low volume dissemination system (LVDS) cable complying with LVDS rules. In this case, data transmitted according to the LVDS rules is a pixel data stream that is a stream form of pieces of pixel data respectively divided into pixels forming one screen frame. The pieces of pixel data forming the pixel data stream are respectively transmitted to the source driver taking charge of each pixel.

However, technology that is three times or more faster than LVDS and has a performance 40% higher than a supperhigh speed connector has been developed. This is right Vby1. Therefore, domestic manufacturers have swiftly adopted Vby1 connectors instead of LVDS in order to realize full high-definition (HD). This Vby1 may realize a data transmission speed of 3.5 Gbpx and this is known as one of existing products having the highest performance.

A high-speed signal interface, such as LVDS or Vby1, is made between a control device (e.g., a host) and a device to be controlled and between a transmitter and a receiver according to a defined protocol. Also, this high-speed communication sensitively responds to a physical interface environment such as several kinds of noise or the like and thus much affects a communication quality of the corresponding signal interface. Therefore, in order to secure a signal quality of a major high-speed interface when designing a system, proceeding a lot of examinations like setting a physical environment, such as a width and/or a length of a signal line, a set value, and the like and finding an optimum value have become important and prioritized.

According to existing technology, in order to verify a high-speed interface path, an optimization examination proceeds when designing a printed circuit board (PCB), and an actual operation signal is measured and checked through various types of measurement devices. In particular, in order to secure an optimum signal quality, a PCB pattern and parts of an application circuit of a corresponding block are changed or set values of a register that may be set are changed one by one to be repeatedly measured. Also, if a substrate or a set layout is changed, this optimum value may be manually repeatedly found.

A point measured through an existing measurement device is not an end point and thus is difficult to be accurately measured due to an effect of a reflected wave. Also, whenever hardware (H/W) (e.g., a PCB or a circuit) or software (S/W) is changed, there is a trouble with repeating measurements and examinations.

SUMMARY

Additional aspects and/or advantages will be set forth in part in the description which follows and, in part, will be apparent from the description, or may be learned by practice of the embodiments.

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a video processing apparatus for completing a margin design by automatically diagnosing a physical signal quality of a communication signal line and finding an optimum value by the diagnosis in order to secure a communication quality of a high-speed interface applied to a TV, a method of driving the video processing apparatus, and a computer readable recording medium.

According to an aspect of the present disclosure, an apparatus for processing a video, includes a storage unit configured to store a plurality of set values corresponding to at least one factor used for a quality measurement of a communication signal line, and a controller configured to transmit a plurality of test signals respectively corresponding to the plurality of set values to a signal receiver connected to the communication signal line and receive a plurality of regression signals respectively corresponding to the plurality of transmitted test signals from the signal receiver. The controller may determine a set value of the factor based on the plurality of received regression signals and transmit a signal to the signal receiver based on the determined set value of the factor.

The factor may be at least one selected from a voltage level, a timing skew, a preemphasis, and an equalizer.

The controller may determine set values of a candidate group, which are determined as passing a check result, from the plurality of set values and determine a minimum value or an intermediate value of the determined set values of the candidate group as a final set value.

The final set value designated as the minimum value may be associated with a delay of the signal that is transmitted to the signal receiver through the communication signal line.

The controller may check the regression signal, which is looped back, by connecting one signal line and another signal line of a plurality of signal lines connected to the signal receiver to each other in the signal receiver.

The controller may transmit a control signal to the signal receiver in order to loop back the test signal, wherein the control signal connects one signal line and another signal line of the plurality of signal lines to each other.

The plurality of signal lines may include differential signal lines that transmit the signal in differential signal forms. The controller may connect one of the differential signal lines and another differential signal line to each other in order to loop back the test signal.

The storage unit may store a reference value that is a criterion of a comparison to check the received regression signal. The controller may check the received regression signal based on the stored reference value.

The test signal may be a signal including bit information. The controller may determine the final set value by checking a bit error of the received regression signal.

The test signal may be a signal including a voltage level. The controller may determine the final set value by checking a voltage level of a regression signal into which the received regression signal is converted by an Analog-Digital-Converter (ADC).

According to another aspect of the present disclosure, a method of driving an apparatus for processing a video, includes storing a plurality of set values corresponding to at least one factor used for a quality measurement of a communication signal line, transmitting a plurality of test signals respectively corresponding to the plurality of set values to a signal receiver connected to the communication signal line and receiving a plurality of regression signals respectively corresponding to the plurality of transmitted test signals from the signal receiver, and determining a set value of the factor based on the plurality of received regression signals and transmitting a signal to the signal receiver based on the determined set value of the factor.

The factor may be at least one selected from a voltage level, a timing skew, a preamphasis, and an equalizer.

The transmitting of the signal may include determining set values of a candidate group, which are determined as passing a check result, from the plurality of set values, and determining a minimum value or an intermediate value of the determined set values of the candidate group as a final set value.

The final set value designated as the minimum value may be associated with a delay of the signal transmitted to the signal receiver through the communication signal line.

The transmitting of the signal may include checking the regression signal, which is looped back, by connecting one signal line and another signal line of a plurality of signal lines connected to the signal receiver to each other in the signal receiver.

The method may further include transmitting a control command to the signal receiver in order to loop back a test signal, wherein the control command connects one signal line and another signal line of the plurality of signal lines to each other.

The plurality of signal lines may include differential signal lines transmitting the signal in differential signal forms. The method may further include connecting one differential signal line and another differential signal line of the differential signal lines to each other in order to loop back the test signal.

The storing may include storing a reference value that is a criterion of a comparison in order to check the received regression signal, and the transmitting of the signal may include checking the received regression signal based on the stored reference value.

The test signal may be a signal including bit information. The transmitting of the signal may include determining the set value by checking a bit error of the received regression signal.

The test signal may be a signal including a voltage level. The transmitting of the signal may include determining the set value by checking a voltage level of a regression signal into which the received regression signal is converted by an ADC.

According to another aspect of the present disclosure, a computer readable recording medium includes a program for executing a method of driving an apparatus for processing a video. The method may include transmitting a plurality of test signals respectively corresponding to a plurality of set values corresponding to at least one factor used for a quality measurement of a communication signal line to a signal receiver connected to the communication signal line and receiving a plurality of regression signals respectively corresponding to the plurality of transmitted test signals from the signal receiver, and determining a set value of the factor based on the plurality of received regression signals and transmitting a signal to the signal receiver based on the determined set value of the factor.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
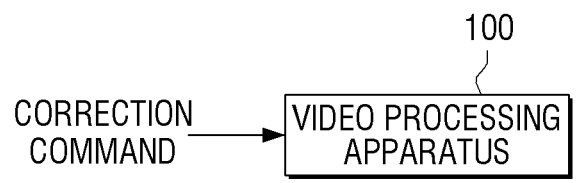
FIG. 1 is a block diagram illustrating a video processing apparatus according to an exemplary embodiment of the present disclosure.

Reference will now be made in detail to the embodiments, examples of which are illustrated in the accompanying drawings, wherein like reference numerals refer to the like elements throughout. The embodiments are described below to explain the embodiments by referring to the figures.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 is a block diagram illustrating a video processing apparatus 100 according to an exemplary embodiment of the present disclosure.

As shown in FIG. 1, the video processing apparatus 100 according to the exemplary embodiment of the present disclosure is an apparatus that individually operates in a stand-alone form and includes a storage unit configured to store a set value for measuring a quality, a receiver configured to receive a test signal, and a controller configured to transmit the test signal to the receiver, and receive and check a regression signal that regresses from the receiver.

The video processing apparatus 100 includes an image display apparatus such as a TV, a portable phone, a desktop computer, a laptop computer, a tablet personal computer (PC), a plasma display panel (PDP), or the like and may further include a communication device such as an access point (AP), a router, a server, or the like. In addition, the video processing apparatus 100 may include a media apparatus such as a blue-ray disk (BD) player, a set-top box, or the like.

The video processing apparatus 100 may be internally installed on a printed circuit board (PCB) to include function blocks for performing various types of operations. These function blocks may be respectively configured as integrated circuits (ICs) or may include the ICs and peripheral circuits around the ICs. Here, if one function block is a control device, another one function block may be a device to be controlled by the control device. Also, if one function block is a transmission device (or unit) that transmits video data, another one function block may be a reception device that receives the video data. Hereinafter, one function block and another one function block will be respectively described as a control device and a device to be controlled. Here, the device to be controlled may be a signal receiver.

When a product is released and then initially operates after being installed in a particular place or there is a command of a user, the video processing apparatus 100 may perform an operation for optimizing communication qualities between the above function blocks. Actually, this operation may be performed in a quality test process before the video processing apparatus 100 is released. For example, the video processing apparatus 100 may be a TV. The user sends a correction command to the video processing apparatus 100 to test a communication quality. This correction command may be executed through a button of the video processing apparatus 100 but may be executed by a method of selecting a particular item on a menu screen displayed on a screen.

As described above, if there is a user request, the video processing apparatus 100, in more accurately, a controller of the video processing apparatus 100, performs an operation for optimizing communication qualities of various types of function blocks connected thereto. In the exemplary embodiment of the present disclosure, a high-speed interface (e.g., a universal serial bus (USB), a mobile industry processor interface (MIPI), peripheral component interconnect express (PCIe), dynamic device reconfiguration (DDR), or the like) that processes video data at a high speed has been exemplarily described. However, any interface capable of processing video data may be used.

In fact, in a case of all types of products, a communication signal line between two function blocks may be variously modified in a manufacturing process. A signal may be distorted or attenuated by this difference, and thus optimum set values of various types of factors that may be set may be found and used in the exemplary embodiment of the present disclosure. Here, a factor may include a voltage level, a timing skew, a preemphasis of a signal transmitted to a signal line, an equalizer of a receiver receiving the signal, and the like. Many detailed set values may exist for one factor. The preemphasis is to relatively strongly improve a signal-to-nose ratio (SNR) of a frequency component of a signal in comparison with another component in order to reduce distortion of the frequency component when transmitting the signal. European area and American area (including Korea and Japan) use different preemphasises. Also, the equalizer indicates a device that restores a signal having a frequency characteristic, which is not uniform by any cause, to an original frequency characteristic.

The video processing apparatus 100 according to the exemplary embodiment of the present disclosure transmits a test signal applying each set value to a signal receiver, checks a returning signal, i.e., a regression signal, and, if the regression signal is within a range of a preset reference value, determines the regression signal as a candidate group that may be first used, in order to find an optimum set value from these detailed set values. In other words, a result of checking the returning signal is classified as pass and fail as shown in Table 1 below. Also, from the detailed set values of the determined candidate group, a minimum value is selected or an intermediate value is selected as a final value (or an optimum value). Since a short delay of a transmitted signal is suitable, a minimum value may be selected as a final value. On the contrary, enough margins may be secured in case of other factors, and thus an intermediate value may be selected and used as a final value.

<Table 1> indicates results of checking various types of factors.

TABLE 1

| Level Register | 0 × 0 | 0 × 1 | 0 × 2 | 0 × 3 | 0 × 4 | 0 × 6 | 0 × 7 |
|---|---|---|---|---|---|---|---|
| Check Result | Fail | Pass | Pass | Pass | Pass | Pass | Fail |
| Delay Register | 0 × 0 | 0 × 1 | 0 × 2 | 0 × 3 | 0 × 4 | 0 × 6 | 0 × 7 |
| Check Result | Fail | Pass | Pass | Pass | Pass | Fail | Fail |
| Strength Register | 0 × 0 | 0 × 1 | 0 × 2 | 0 × 3 | 0 × 4 | 0 × 6 | 0 × 7 |
| Check Result | Fail | Fail | Pass | Pass | Pass | Pass | Fail |

The video processing apparatus 100 may check a signal received through one signal line in order to receive a signal returning from a device to be controlled. However, in a case of a differential line transmitting a signal according to a differential method, a test signal may be transmitted to one signal line, and a test signal may be received through another one signal line so as to check the received test signal. Actually, these signal lines are formed on the same layer in a process and thus are generally formed in the same process condition. Therefore, if there is a modification on one signal line, there may be equally a modification on another one signal line. As a result, in the exemplary embodiment, a transmission line of a signal and a reception line of a test signal may have the same modification form, and thus a test signal received on this assumption may be checked. Also, the video processing apparatus 100 may check a test signal by looping a plurality of signal lines back in order to rapidly perform a quality test even in terms of efficiency of the quality test.

Therefore, if a signal distortion or attenuation occurs two times in the test signal received by the loopback when checking the test signal, a set value of a candidate group may be selected after excluding one-time signal distortion or attenuation when checking a signal, and one set value may be finally selected from set values of the selected candidate group. As a result, the exemplary embodiment of the present disclosure may not particularly limit the number of used lines and a method of connecting which signal lines to loop a test signal back and then receive the test signal. Other detailed contents will be described later.

In addition, if video processing the apparatus 100 according to the exemplary embodiment of the present disclosure operates in a stand-alone form as shown in FIG. 1, the video processing apparatus 100 may include a program for automatically setting an optimum set value of a communication signal. Here, the program may change or update an associated program included in an electrically erasable and programmable read only memory (EEPROM) or the like by using an additional apparatus.

Figure 2:
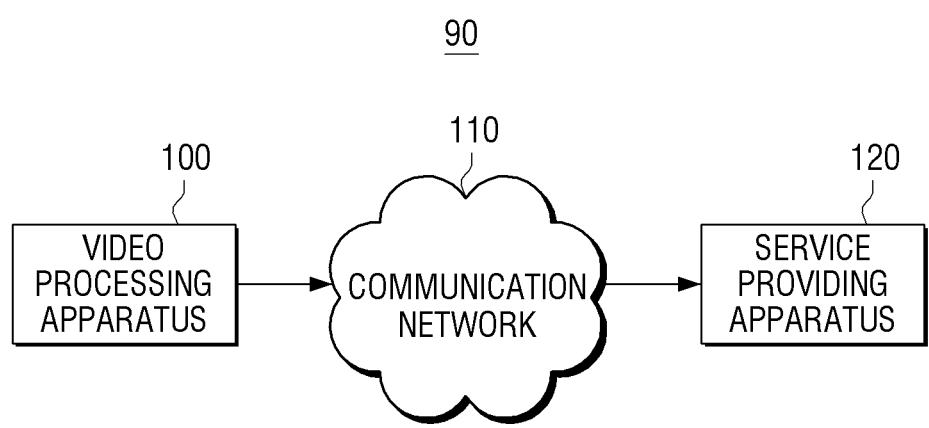
FIG. 2 is a block diagram illustrating a video processing system according to an exemplary embodiment of the present disclosure.

FIG. 2 is a block diagram illustrating a video processing system 90 according to an exemplary embodiment of the present disclosure.

As shown in FIG. 2, the video processing system 90 according to the exemplary embodiment of the present disclosure includes some or all of a video processing apparatus 100, a communication network 110, and a service providing apparatus 120.

The "inclusion of some or all" indicates that the video processing system 90 is configured by omitting an element such as the communication network 110, for example, the video processing apparatus 100 and the service providing apparatus 120 (e.g. a PC) may perform a direct communication. The video processing system 90 will be described as including all of the elements in order to help sufficient understanding of the present disclosure.

The video processing apparatus 100 of FIG. 2 is not greatly different from the video processing apparatus 100 of FIG. 1. However, the video processing apparatus 100 of FIG. 2 is different from the video processing apparatus 100 of FIG. 1 in that when the video processing apparatus 100 of FIG. 2 is connected to the communication network 110, the video processing apparatus 100 of FIG. 2 is connected to the service providing apparatus 120 to remotely perform a self-diagnosis, i.e., an operation such as a quality test mentioned above. In other words, if the video processing apparatus 100 is remotely controlled by the service providing apparatus 120, a request for a quality test may be provided to the service providing apparatus 120.

The communication network 110 includes all of wire and wireless communication networks. Here, the wire communication network includes an Internet network such as a cable network or a Public Switched Telephone Network (PSTN), and the wireless communication network includes Code Division Multiple Access (CDMA), Wideband Code Division Multiple Access (WCDMA), Global System/Standard for Mobile Communication (GSM), Evolved Packet Core (EPC), Long Term Evolution (LTE), Wireless Broadband Internet (WBro), or the like. The communication network 110 according to the exemplary embodiment of the present disclosure is not limited thereto and may be used as an access network of a next generation mobile communication system that will be realized later, e.g., for a cloud computing network or the like in a cloud computing environment. For example, if the communication network 110 is the wire communication network, an AP of the communication network 110 may access an exchange office of a telephone company or the like. If the communication network 110 is the wireless communication network, the AP may process data by accessing Service GPRS Support Node (SGSN) or Gateway GPRS Support Node (GGSN) operated by a communication company or may process data by accessing various types of relays such as Base station Transmission (BTS), NodeB, e-NodeB, and the like.

The communication network 110 may include an AP. The AP includes a small base station such as a femto or pico base station that is frequently installed in a building. Here, the femto or pico base station may be classified according to how many video processing apparatuses 100 may access according to classification of base stations. The AP includes a short-range communication module for performing a short-range communication such as Zigbee, or the like, with the video processing apparatus 100. The AP may use Transmission Control Protocol/Internet Protocol (TCP/IP) or Real-Time Streaming Protocol (RTSP) for a wireless communication. Here, the short-range communication may be performed according to various types of standards such as Bluetooth, Zigbee, Infrared Data Association (IrDA), Radio Frequency (RF) such as Ultra High Frequency (UHF) or Very High Frequency (VHF), Ultra Wideband (UWB), and the like. Therefore, the AP may extract a position of a data packet, designate an optimum communication path of the extracted position, and transmit the data packet to a next apparatus, e.g., to the video processing apparatus 100, along the designated communication path. The AP may share several lines in a general network environment, for example, may include a router, a repeater, a relay, and the like.

The service providing apparatus 120 includes a server that is operated by a producer or a seller producing or selling the video processing apparatus 100. The service providing apparatus 120 may be remotely controlled so as to enable the video processing apparatus 100 to perform a quality test. Also, if updating a program for the quality test is required, the service providing apparatus 120 may provide the video processing apparatus 100 with the corresponding program in a firmware form and request the video processing apparatus 100 to update the program. In addition, the service providing apparatus 120 may operate as a kind of cloud server. In other words, the service providing apparatus 120 may include HW resources or SW resources of the video processing apparatus 100 to be provided a test signal from the video processing apparatus 100 having minimum resources, check the test signal, and request the video processing apparatus 100 to designate a set value finally selected according to the check result with respect to a communication signal transmitted to a corresponding communication signal line.

The service providing apparatus 120 according to the exemplary embodiment of the present disclosure is not limited to the cloud server. For example, if the video processing apparatus 10 performs a direct communication with the service providing apparatus 120 by omitting the communication network 110, the service providing apparatus 120 may be an external apparatus, i.e., an AP, or a peripheral device such as a desktop computer. Alternatively, if the service providing apparatus 120 is capable of checking the test signal provided from the video processing apparatus 100 and providing the check result or providing merely a final set value, the service providing apparatus 120 may be any type of apparatus. In this point of view, the service providing apparatus 120 may be a set value providing apparatus.

Figure 3:
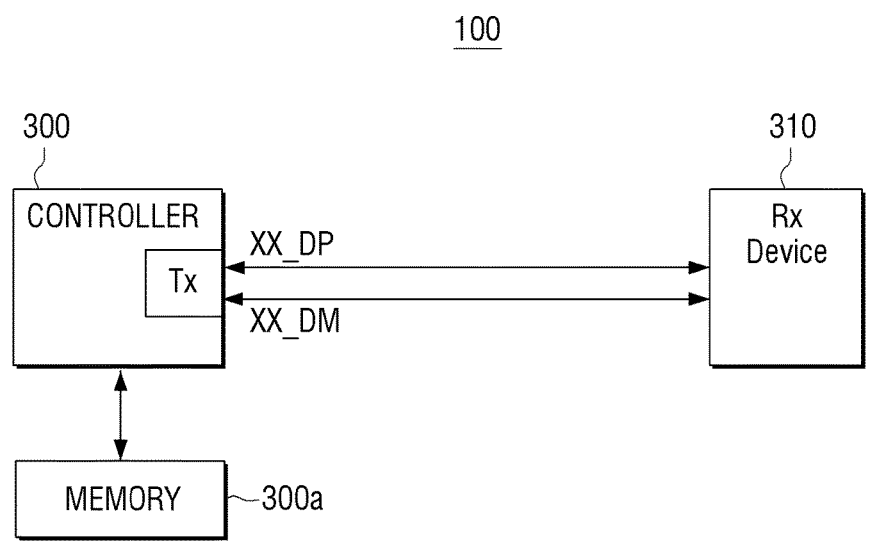
FIG. 3 is a block diagram illustrating a detailed configuration of a video processing apparatus as shown in FIG. 1, according to an exemplary embodiment of the present disclosure.
Figure 4:
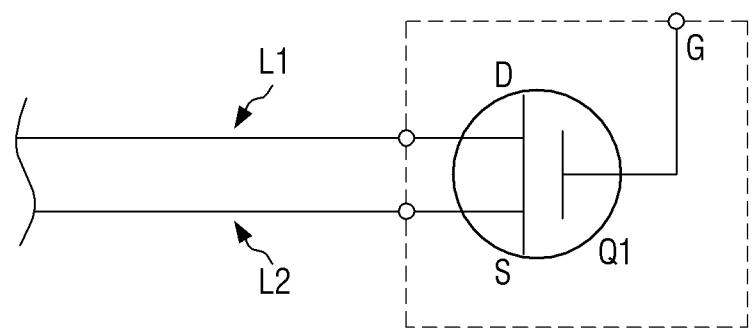
FIG. 4 is a circuit diagram illustrating a partial configuration of a device to be controlled shown in FIG. 3, according to an exemplary embodiment of the present disclosure.

FIG. 3 is a block diagram illustrating a detailed configuration of the video processing apparatus 100 shown in FIG. 1, according to an exemplary embodiment of the present disclosure. FIG. 4 is a circuit diagram illustrating a partial configuration of a device to be controlled shown in FIG. 3, according to an exemplary embodiment of the present disclosure.

As shown in FIG. 3, the video processing apparatus 100 according to the exemplary embodiment of the present disclosure includes a controller 300 and a controlled device 310 (or a signal receiver) and may further include a memory 300a.

The controller 300 according to the exemplary embodiment of the present disclosure is connected to the controlled device 310 through one differential signal line DP or DM. Here, the one differential signal line refers to a signal line through which the controller 300 transmits video data to the controlled device 310. Here, when transmitting the video data, pixel information is transmitted according to a voltage difference between two signal lines, i.e., according to a differential method.

In a connection structure as described above, the controller 300 may transmit a control signal to the controlled device 310 to test a quality of a differential signal line. Here, the control signal is transmitted when there is a user command to request a quality test of a signal line.

As shown in FIG. 4, the transmitted control signal may be input into a gate terminal of a switching device Q1 included in the controlled device 310 so as to enable two signal lines L1 and L2 to be connected to each other.

In this case, the controller 300 performs a quality test for a differential signal line by executing a correction program for a quality test, wherein the correction program is stored in an internal memory (not shown) or the external memory 300a. For example, the controller 300 transmits a test signal to the controlled device 310 by applying a particular factor, e.g., one of a plurality of set values for a voltage level factor, to the test signal and receives a signal that is looped back through the controlled device 310. Thereafter, the controller 300 checks whether the received test signal is within a range of a reference set value. If the received test signal is within the range of the reference set value, the controller 300 determines that the test signal passes the check. According to this method, the controller 300 measures a quality by reflecting various types of set values for the same factor on the test signal and measures a quality of another factor according to the same method as mentioned. Here, the another factor refers to a timing skew, a preemphasis, a receiver equalizer, or the like.

If the quality measurement is completed by this method, the controller 300 selects an optimum set value considering margin from set values of a candidate group passing a check for one factor. For example, if a set value associated with a delay of a signal is to be selected, a minimum value is selected from set values of a candidate group. Otherwise, an intermediate value is selected from the set values of the candidate group to secure margin. According to this process, the controller 300 determines an optimum set value for various types of factors, i.e., an optimum value (or a final value) and then processes a communication signal processed in an actual environment by reflecting the determined optimum set value.

If the controller 300 receives a test signal, on which a voltage level of an electrical characteristic is reflected, in this process, the controller 300 may perform a process of selecting the above set value by checking a power level of a signal generated by performing an analog-to-digital conversion (ADC) with respect to the received signal. Also, if a test signal including bit information is used, the controller 300 may perform the process of selecting the set value by checking whether a bit error occurs or the like. For example, if a test signal that is looped back, i.e., a regression signal, does not have a designated test pattern, the controller 300 may determine that the bit error occurs. Here, the "test pattern" may refer to values of a plurality of bit strings. For example, if bit information of the transmitted test signal is "1100100", a form of this bit information may be a test pattern.

The controlled device 310 corresponds to a function block for performing a particular function in the video processing apparatus 100. For example, the controlled device 310 may be a timing controller or a source driver in a case of TV. The controlled device 310 according to the exemplary embodiment of the present disclosure may refer to various types of function blocks. Therefore, if two signal lines are formed as a loop, not the one switching device Q1 as shown in FIG. 4 but various types of structures may be included.

Also, as mentioned above, the controlled device 310 may receive a control signal for controlling the switching device Q1 through a signal line of differential signal lines to which a test signal is transmitted. However, if the controller 300 and the controlled device 310 form an additional control line, the control line may be used and thus may not be limited to the above-described contents.

The memory 300a may be included in the controller 300 but may be connected outside as shown in FIG. 3. The memory 300a may store an algorithm for a quality test for a differential signal line, i.e., a program, and the stored program may be executed under control of the controller 300. Also, the memory 300a may store set values corresponding to various types of factors for a quality test as described above and store a reference set value for checking the received test signal.

In addition, the memory 300a may store various types of information processed in a quality test process of the controller 300. For example, if a test signal passes a check according to a result of checking the test signal that is looped back by reflecting one set value, the memory 300a may store corresponding information. Information stored as described above may be provided on request of the controller 300 or may be used when selecting an optimum set value by an execution of a program.

Figure 5:
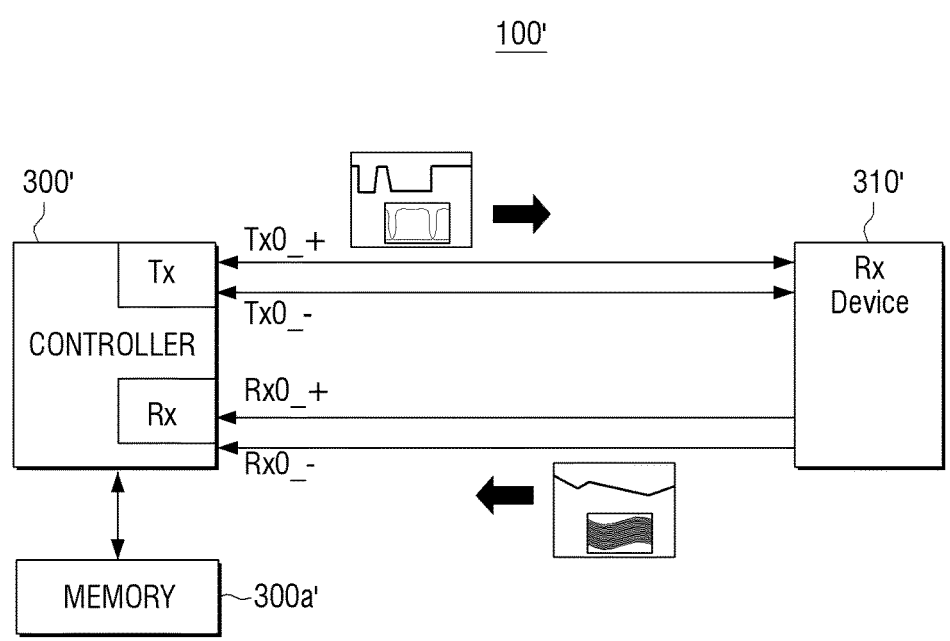
FIG. 5 is a diagram illustrating a detailed configuration of a video processing apparatus as shown in FIG. 1, according to another exemplary embodiment of the present disclosure.
Figure 6:
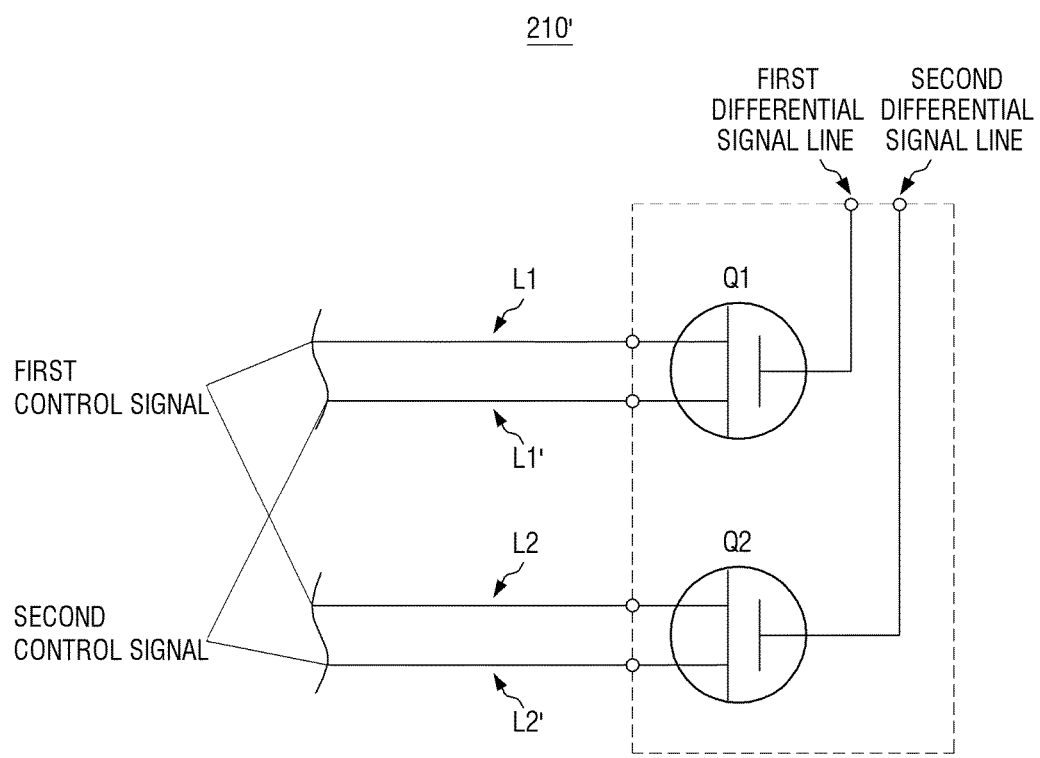
FIG. 6 is a circuit diagram illustrating a partial configuration of a device to be controlled shown in FIG. 5, according to an exemplary embodiment of the present disclosure.

FIG. 5 is a diagram illustrating a detailed configuration of a video processing apparatus 100' as shown in FIG. 1, according to an exemplary embodiment of the present disclosure FIG. 6 is a circuit diagram illustrating a partial configuration of a controlled device 310' as shown in FIG. 5, according to an exemplary embodiment of the present disclosure In comparison of the video processing apparatus 100' of FIG. 5 with the video processing apparatus 100 of FIG. 3, the video processing apparatus 100' of FIG. 5 is different from the video processing apparatus 100 of FIG. 3 in that a controller 300' is connected to the controlled device 310' through a plurality of differential signal lines Tx0+, Tx0−; Rx0+, and Rx0−.

If one differential signal line Tx0+ or Tx0− is a signal line through which the controller 300' transmits video data (information) to the controlled device 310', another differential signal line Rx0+ or Rx0− corresponds to a signal line through which the controller 300' receives the video data from the controlled device 310'.

If there is a user command for a quality test of a signal line as the controller 300' is connected to the controlled device 310' through a plurality of differential signal lines, the controller 300' transmits a control command (or a control signal) to the controlled device 310'. Here, since the controlled controller 310' is configured to connect a plurality of signal lines to one another by two switching devices Q1 and Q2 as shown in FIG. 6, a loop may be formed by connecting one signal line of first differential signal lines and one signal line of second differential lines to each other.

For convenience of description, FIG. 6 illustrates that switching devices may be respectively controlled by two control signals. However, if gate terminals of the switching devices are commonly connected, the switching devices may be controlled through one control signal and thus may not be limited to the above-described contents in the exemplary embodiment of the present disclosure. In other words, if a loop is formed according to the exemplary embodiment of the present disclosure, the loop may use any structure or any method. Therefore, the loop may not be particularly limited to a method of configuring and controlling the loop.

Except for this point, the controller 300', the controlled device 310', and the memory 300a' of FIG. 5 are not greatly different from the controller 300, the controlled device 310, and the memory 300a of FIG. 3. Therefore, contents of the controller 300, the controlled device 310, and the memory 300a shown in FIG. 3 are replaced with contents of the controller 300', the controlled device 310', and the memory 300a' of FIG. 5.

Figure 7:
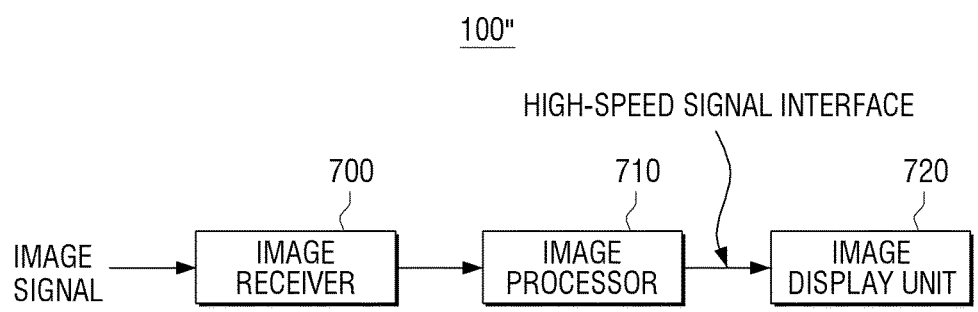
FIG. 7 is a block diagram illustrating a detailed configuration of a video processing apparatus as shown in FIG. 1, according to another exemplary embodiment of the present disclosure.
Figure 8:
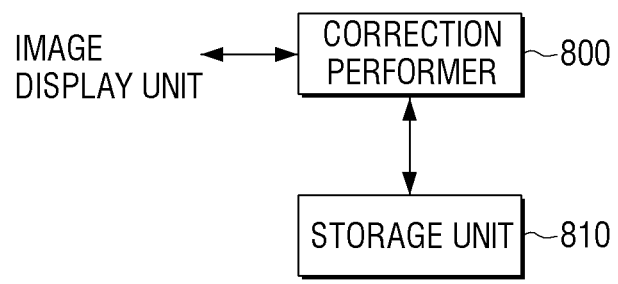
FIGS. 8 through 10 are diagrams illustrating various modifications of an image processor of FIG. 7, according to exemplary embodiments of the present disclosure.
Figure 9:
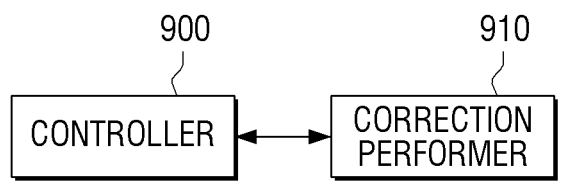
Figure 10:
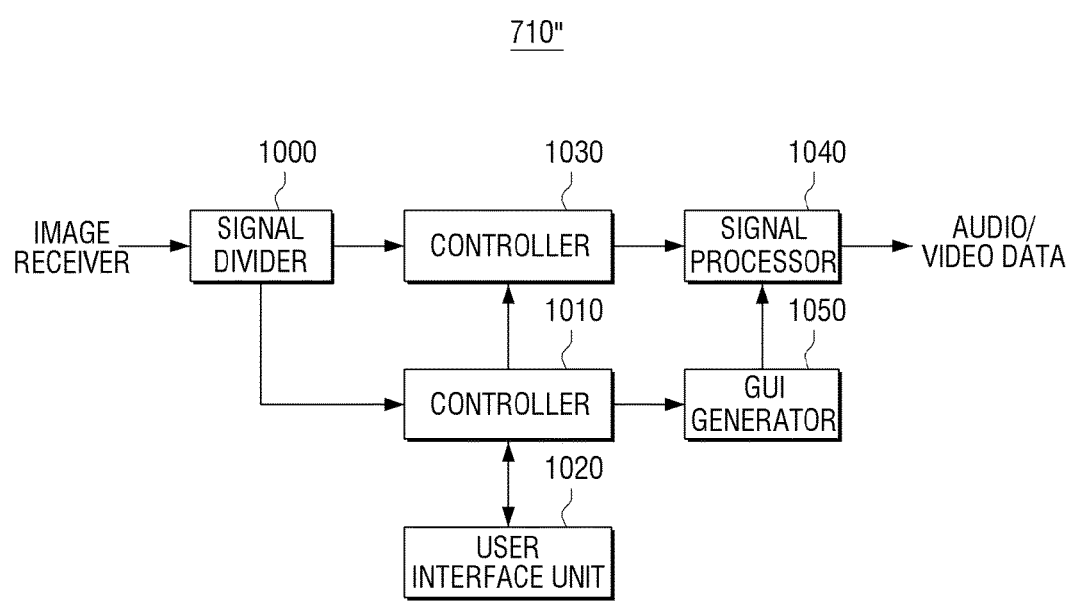
Figure 11:
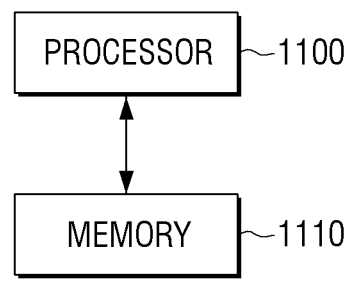
FIG. 11 is a block diagram illustrating a detailed configuration of a controller of FIGS. 9 and 10, according to an exemplary embodiment of the present disclosure.
Figure 12:
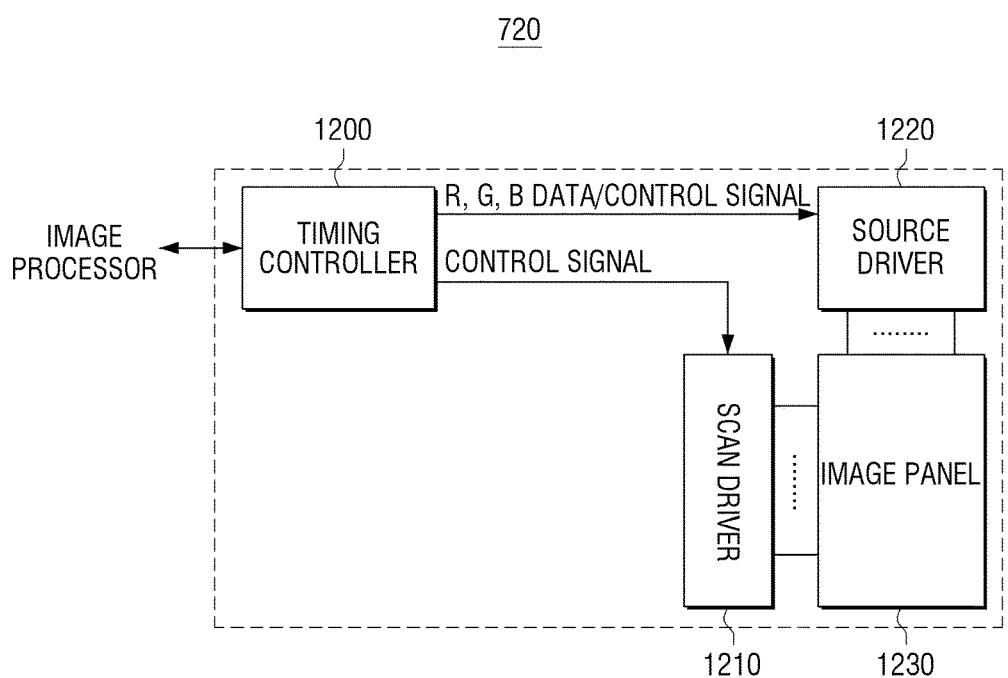
FIG. 12 is a block diagram illustrating a detailed configuration of an image display unit of FIG. 7, according to an exemplary embodiment of the present disclosure.

FIG. 7 is a block diagram illustrating a detailed configuration of a video processing apparatus 100" as shown in FIG. 1, according to another exemplary embodiment of the present disclosure. FIGS. 8 through 10 are block diagrams illustrating various modifications of an image processor shown in FIG. 7. FIG. 11 is a block diagram illustrating a detailed configuration of a controller shown in FIG. 10, according to an exemplary embodiment of the present disclosure. FIG. 12 is a block diagram illustrating a detailed configuration of an image display unit shown in FIG. 7, according to an exemplary embodiment of the present disclosure.

As shown in FIG. 7, the video processing apparatus 100" according to the another exemplary embodiment of the present disclosure is, for example an image display apparatus and includes some or all of an image receiver 700, an image processor 710, and an image display unit 720. Here, the "inclusion of some or all" is the same as the above-mentioned meaning.

Hereinafter, an association with a method of testing a quality of a communication signal line or the like will be described in brief according to an exemplary embodiment of the present disclosure.

The image receiver 700 may be connected to a broadcasting station server operated by a broadcasting station or a search server operated by a search specialized portal enterprise to receive an image signal. For this, the image receiver 700 may include a communication module for receiving the image signal. The communication module may include various types of modules that operate according to different rules, such as a short-range communication module, a Global Positioning System (GPS) module for receiving an image through a GPS, and the like.

The image processor 710 may be configured in various forms as shown in FIGS. 8 through 10. In other words, the image processor 710 may include some or all of a correction performer 800 and a storage unit 810 as shown in FIG. 8. Here, the inclusion of some or all means that the storage unit 810 may be integrated into the correction performer 800.

The correction performer 800 may execute a control function and an operation for a quality test in terms of software according to the exemplary embodiment of the present disclosure. For example, if a user command for a quality test is input into the correction performer 800, the correction performer 800 may perform various types of operations for a quality test as described above with reference to FIGS. 3 and 5. Also, the storage unit 810 may perform functions like the memories 300a and 300a' of FIGS. 3 and 5. Therefore, detailed contents associated with the storage unit 810 are replaced with the above contents.

As shown in FIG. 9, an image processor 710' may be divided into a controller 900 that performs a control function in terms of hardware and a correction performer 910 that performs a quality test. If there is a user command to request a quality test, the controller 900 operates the correction performer 910. In this case, the correction performer 910 may execute an internally stored program for a quality test according to a request of the controller 900. In other words, the controller 900 executes the correction performer 910 in order to transmit a test signal to the image display unit 720 of FIG. 7, check the returning test signal, and deduce an optimum set value.

In addition, the image processor 710 may include function blocks for performing a detailed operation as an image display apparatus such as a TV as shown in FIG. 10. Actually, functions of all elements of FIG. 10 may be regarded as being performed by the correction performer 800 in FIG. 8 or by the controller 900 and the correction performer 910 in FIG. 9.

If an image signal is received, a signal divider 1000 may divide the image signal into a video signal, an audio signal, and additional information and provide the video signal, the audio signal, and the additional information to a controller 1010. In this case, the controller 1010 may store the divided additional information in an additional storage unit or an internal memory.

Also, the controller 1010 may perform a quality test measurement of a signal line according to a user command input through a user interface unit 1020. In addition, the controller 1010 may control decoding of video and audio processed by a decoder 1030. The decoder 1030 may be regarded as restoring input compressed data, and the controller 1010 is involved in this.

A signal processor 1040 performs scaling of video, post-processing of audio, or the like. Also, under control of the controller 1010, if a graphical user interface (GUI) generator 1050 provides an image for displaying a men screen, the signal processor 1040 may synthesize and output the image.

Even if the video processing apparatus 100" of FIG. 7 according to another exemplary embodiment of the present disclosure has a structure as shown in FIG. 10, the video processing apparatus 100" may perform an operation for a quality test of each signal line.

The controller 900 of FIG. 9 or the controller 1010 of FIG. 10 according to the exemplary embodiment of the present disclosure may include a processor 1100 and a memory 1110 comprising a computer as shown in FIG. 11. For example, if the controller 900 of FIG. 9 or the controller 1010 of FIG. 10 is formed as a chip, the controller 900 of FIG. 9 and the controller 1010 of FIG. 10 may include the memory 1110 to be formed as one chip.

If the controller 900 or the controller 1010 is configured as described above, for example, as shown in FIG. 9, the processor 1100 may load and store the program stored in the correction performer 910 in the memory 1110 of FIG. 11. Also, the processor 1100 may execute the program stored in the memory 1110 for a quality test of a signal line according to an exemplary embodiment of the present disclosure.

An operation as described above may enable a data processing speed to be faster than operating the correction performer 910 through the controller 900 in FIG. 9.

Referring to FIG. 7 again, the image display unit 720 may form a high-speed signal interface for processing video data at a high speed, along with the image processor 710. The image display unit 720 may have a structure as shown in FIG. 12 and includes a timing controller 1200, a scan driver 1210, a source driver 1220, and an image panel 1230. The image display unit 720 may further include a power voltage generator and the like.

The timing controller 1200 may receive vertical and/or horizontal synchronization signals, video data, and the like from the image processor 710. In this case, the timing controller 1200 may generate a control signal for controlling the scan driver 1210 and the source driver 1220 by using the vertical and/or horizontal synchronization signals. Also, the timing controller 1200 may generate video data having a resolution appropriate for an image panel 1230. For example, if 8-bit R, G, and B data is input from the image processor 710, the timing controller 1200 may convert the 8-bit R, G, and B data into 6-bit R, G, and B data so as to enable the 8-bit R, G, and B data to be appropriate for the image panel 1230.

The scan driver 1210 controls on and/or off corresponding to a scan line of the image panel 1230, i.e., one horizontal line, according to a scan control signal provided from the timing controller 1200. For example, the scan driver 1210 sequentially scan-drives first through $n^{th}$ horizontal lines for realizing an image of a unit frame.

The source driver 1220 is provided with R, G, and B data from the timing controller 1200 in serial, processes the R, G, and B data in parallel, and provides the processed R, G, and B data to the image panel 1230. In other words, if the first horizontal line is turned on through the scan driver 1210, an image corresponding to one horizontal line is realized by simultaneously providing pixel data to the corresponding horizontal line through a plurality of data lines. According to this method, an image of one unit frame is realized by sequentially providing data respectively corresponding to horizontal lines.

The image panel 1230 includes a plurality of R, G, and B light-emitting devices for realizing image data. Representatively, the image panel 1230 may include an organic light-emitting diode (OLED) as a self-emitting device. The image panel 1230 may be configured as various types such as a liquid crystal display (LCD) panel having LED backlight, an LCD panel having LED backlight and having no color filter, and the like. Therefore, the exemplary embodiment of the present disclosure may not be limited to being applied to which type of image panel 1230.

Figure 13:
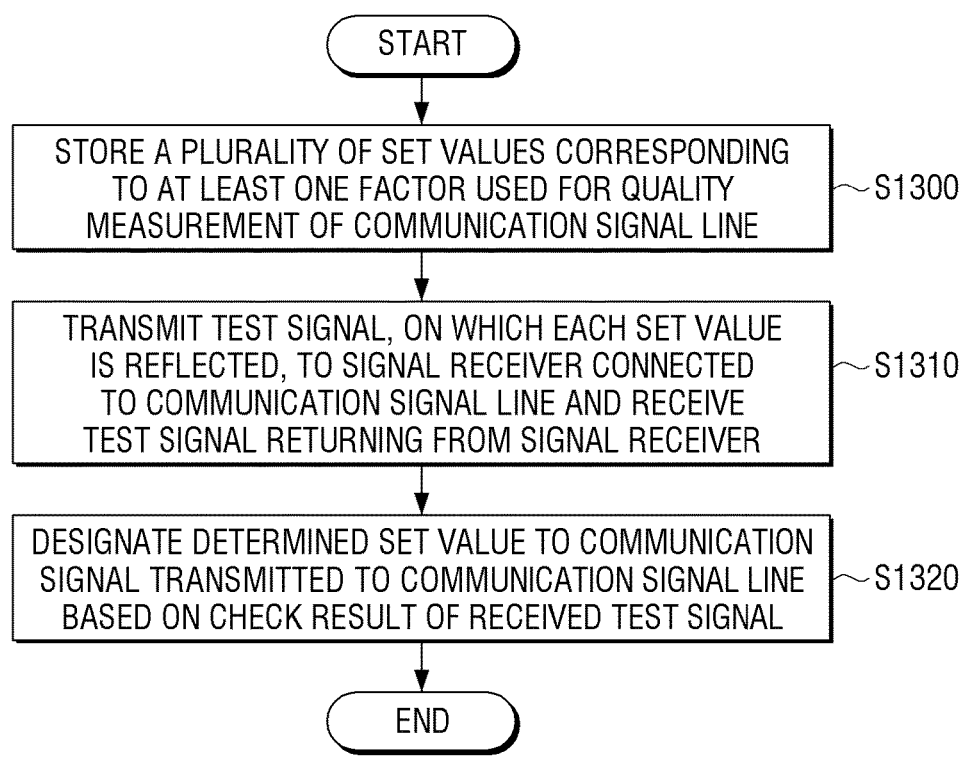
FIG. 13 is a flowchart illustrating a process of driving a video processing apparatus, according to an exemplary embodiment of the present disclosure.

FIG. 13 is a flowchart illustrating a process of driving a video processing apparatus according to an exemplary embodiment of the present disclosure.

For convenience of description, referring to FIG. 13 along with FIG. 1, the video processing apparatus 100 according to the exemplary embodiment of the present disclosure stores a plurality of set values corresponding to at least one factor used for a quality measurement of a communication signal line in operation S1300. Reference values of the factor may be respectively stored together in this storing process. Here, the factor refer to a voltage level, a timing skew, or the like.

In operation S1310, the video processing apparatus 100 transmits a test signal, on which a set value is reflected, to a signal receiver connected to the communication signal line and receives the test signal returning from the signal receiver. Here, the "returning test signal" may be fed back to the same signal line and may be looped back to another signal line.

In operation S1320, the video processing apparatus 100 stores a set value, which is determined based on a check result of the received test signal, as a set value of a communication signal transmitted to the communication signal line.

For example, as described above, the video processing apparatus 100 checks the received test signal, determines whether a plurality of set values corresponding to one factor pass or fail checking, selects the passing set values as a candidate group, and selects a minimum value or an intermediate value as a final set value. Through this, the video processing apparatus 100 may minimize a delay of a signal to be transmitted and secure sufficient margin for other factors.

Figure 14:
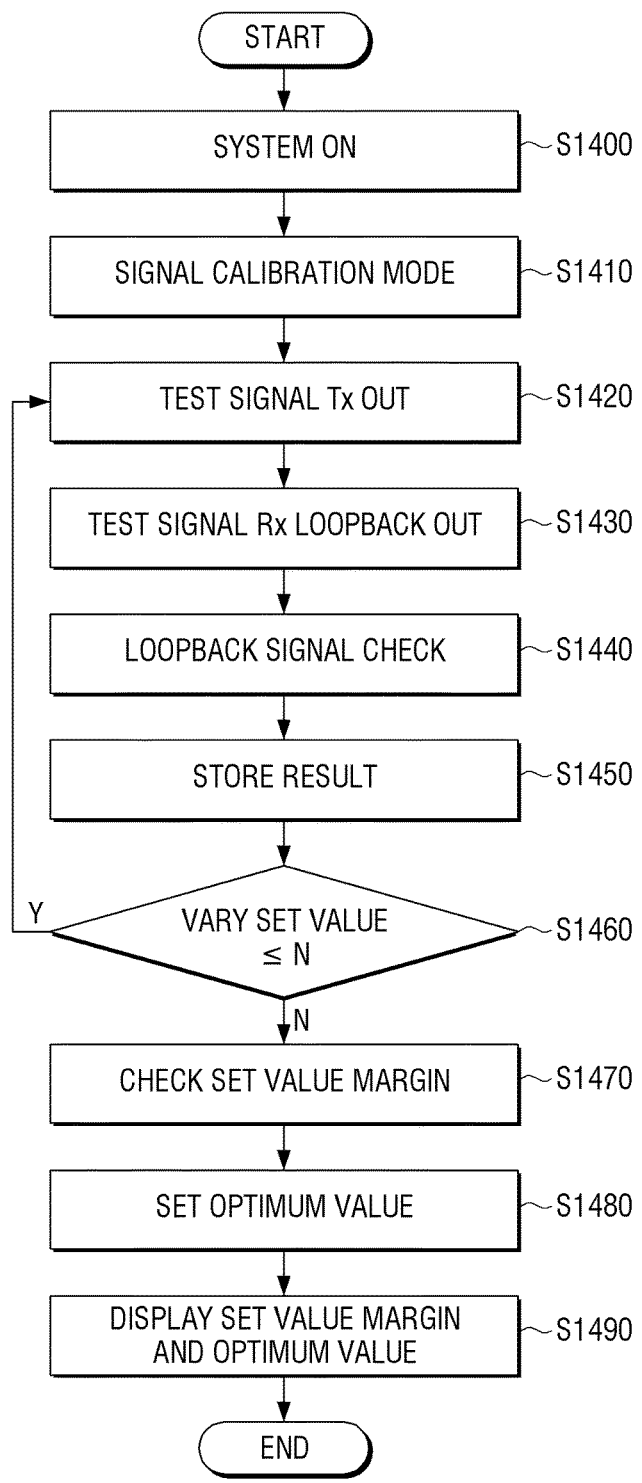
FIG. 14 is a flowchart illustrating a process of driving video processing apparatus, according to another exemplary embodiment of the present disclosure.

FIG. 14 is a flowchart illustrating a process of driving a video processing apparatus, according to another exemplary embodiment of the present disclosure.

For convenience of description, referring to FIG. 14 along with FIG. 1, if the video processing apparatus 100 according to the exemplary embodiment of the present disclosure is turned on, the video processing apparatus 100 may perform a signal correction, i.e., a quality test process, according to a request of a user in operations S1400 and S1410.

In operations S1420 and S1430, the video processing apparatus 100 transmits a test signal, on which one of a plurality of set values corresponding to one factor is reflected, to a signal receiver and receives the test signal returning (e.g., looped back) from the signal receiver.

In operations S1440 and S1450, the video processing apparatus 100 checks the received test signal and stores the check result.

In operation S1460, the video processing apparatus 100 repeats operations S1420 through S1450 with varying a set value of the same factor.

If there is no set value to be applied any more in operation S1460, the video processing apparatus 100 selects a set value, which is shortly delayed and is capable of securing margin, by checking the stored check result in operation S1470.

In operation S1480 and S1490, the video processing apparatus 100 may determine an optimum set value from selected set values and notify a user of a result of this. For example, if the video processing apparatus 100 is a TV, a corresponding result may be displayed on a screen.

As described above, according to an exemplary embodiment of the present disclosure, before an operation of a system, i.e., an operation of an apparatus, whether a problem occurs in a signal line of each interface may be checked according to sets, e.g., according to function blocks, and a signal quality between apparatuses may be automatically optimized so as to enable a communication problem not to occur between apparatuses. Therefore, complicated and cumbersome measurements that are performed through existing equipment do not need to be repeatedly performed, and thus a verification time may be reduced. Also, an operation margin may be secured by extracting a scattering problem of parts associated with each interface in advance.

Also, a quality of a corresponding interface may be secured by easily automatically setting a change in a physical signal line, i.e., a change in a signal transmission path (or a structure change such as a change in a PCB material, the number of layers, a layout, a connector, a cable insertion, or the like), between a signal transmitter and a signal receiver, a change in SW of an associated function block, and the like case by case.

Although all elements configuring an exemplary embodiments of the present disclosure are described as being combined into one or combined and operated, the present disclosure is not limited to this exemplary embodiment. In other words, within a purpose scope of the present disclosure, all elements may be selectively combined into one or more and operate. Also, the all elements may be respectively embodied as one independent piece of hardware but may be embodied as a computer program including a program module performing some or all of functions of selectively combining some or all of the elements in one piece or a plurality of pieces of hardware. Codes and code segments configuring the computer program may be easily inferred by those skilled in the art. The computer program may be stored on a non-transitory computer readable medium to be read and executed by a computer so as to embody exemplary embodiments of the present disclosure.

The non-transitory computer readable medium is a medium which does not store data temporarily such as a register, cash, and memory but stores data semi-permanently and is readable by devices such as a processor or computer. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An apparatus for processing a video, the apparatus comprising:
    a storage unit configured to store a plurality of set values corresponding to at least one factor used for a quality measurement of a communication signal line and a reference value; and
    a controller configured to transmit a plurality of test signals respectively corresponding to the plurality of set values to a signal receiver connected to the communication signal line and receive a plurality of regression signals respectively corresponding to the plurality of transmitted test signals from the signal receiver,
    wherein the controller compares the plurality of regression signals with the reference value determines a set value of the factor among the plurality of set values based on a result of the comparison and transmits a signal to the signal receiver based on the set value of the factor.

2. The apparatus of claim 1, wherein the factor is at least one selected from a voltage level, a timing skew, a preemphasis, and an equalizer.

3. The apparatus of claim 2, wherein the controller determines set values of a candidate group, which are determined as passing a check result, from the plurality of set values and determines one of a minimum value and an intermediate value of the set values of the candidate group as a final set value.

4. The apparatus of claim 3, wherein the final set value designated as the minimum value is associated with a delay of the signal that is transmitted to the signal receiver through the communication signal line.

5. The apparatus of claim 1, wherein the controller checks a regression signal, which is looped back, by connecting one signal line and another signal line of a plurality of signal lines connected to the signal receiver to each other in the signal receiver.

6. The apparatus of claim 5, wherein the controller transmits a control signal to the signal receiver to loop back a test signal, wherein the control signal connects the one signal line and the another signal line of the plurality of signal lines to each other.

7. The apparatus of claim 5, wherein the plurality of signal lines comprise differential signal lines that transmit the signal in differential signal form, wherein the controller connects one of the differential signal lines and another differential signal line to each other to loop back a test signal.

8. The apparatus of claim 1, wherein a test signal is a signal comprising a voltage level,
wherein the controller determines a final set value by checking the voltage level of a regression signal into which a received regression signal is converted by an Analog-Digital-Converter (ADC).

9. The apparatus of claim 1, wherein a test signal is a signal comprising bit information,
wherein the controller determines a final set value by checking a bit error of a received regression signal.

10. A method of driving an apparatus for processing a video, the method comprising:
storing a plurality of set values corresponding to at least one factor used for a quality measurement of a communication signal line and a reference value;
transmitting a plurality of test signals respectively corresponding to the plurality of set values to a signal receiver connected to the communication signal line and receiving a plurality of regression signals respectively corresponding to the plurality of transmitted test signals from the signal receiver;
comparing the plurality of regression signals with the reference value; and
determining a set value of the factor among the plurality of set values based on a result of the comparison and transmitting a signal to the signal receiver based on the set value of the factor.

11. The method of claim 10, wherein the factor is at least one selected from a voltage level, a timing skew, a preamphasis, and an equalizer.

12. The method of claim 11, wherein the transmitting of the signal comprises:
determining set values of a candidate group, which are determined as passing a check result, from the plurality of set values; and
determining one of a minimum value and an intermediate value of the determined set values of the candidate group as a final set value.

13. The method of claim 12, wherein the final set value designated as the minimum value is associated with a delay of the signal transmitted to the signal receiver through the communication signal line.

14. The method of claim 10, wherein the transmitting of the signal comprises checking a regression signal, which is looped back, by connecting one signal line and another signal line of a plurality of signal lines connected to the signal receiver to each other in the signal receiver.

15. The method of claim 14, further comprising:
transmitting a control command to the signal receiver in order to loop back a test signal, wherein the control command connects one signal line and another signal line of the plurality of signal lines to each other.

16. The method of claim 14, wherein the plurality of signal lines comprise differential signal lines transmitting the signal in differential signal form,
wherein the method further comprises connecting one differential signal line and another differential signal line of the differential signal lines to each other in order to loop back a test signal.

17. The method of claim 10, wherein a test signal is a signal comprising a voltage level,
wherein the transmitting of the signal comprising determining a set value by checking the voltage level of a regression signal into which a received regression signal is converted by an ADC (Analog-Digital-Converter).

18. A non-transitory computer readable recording medium comprising a program for executing a method of driving an apparatus for processing a video, the method comprising:
transmitting a plurality of test signals respectively corresponding to a plurality of set values corresponding to at least one factor used for a quality measurement of a communication signal line to a signal receiver connected to the communication signal line and receiving a plurality of regression signals respectively corresponding to a plurality of transmitted test signals from the signal receiver;
comparing the plurality of regression signals with a reference value; and
determining a set value of the factor among the plurality of set values based on a result of the comparison and transmitting a signal to the signal receiver based on the set value of the factor.

* * * * *